United States Patent [19]

Hara

[11] Patent Number: 5,616,929
[45] Date of Patent: Apr. 1, 1997

[54] INK TANK WITH AN INK LEVEL DETECTOR HAVING A VIEWING WINDOW

[75] Inventor: Kohzo Hara, Ebina, Japan

[73] Assignee: Fuji Xerox Co., Ltd., Tokyo, Japan

[21] Appl. No.: 610,344

[22] Filed: Mar. 4, 1996

Related U.S. Application Data

[63] Continuation of Ser. No. 321,268, Oct. 11, 1994, abandoned.

[30] Foreign Application Priority Data

Feb. 7, 1994 [JP] Japan .................................. 6-034133

[51] Int. Cl.⁶ .......................... G01N 15/06; G01N 21/49; G01N 21/85
[52] U.S. Cl. .......................... 250/573; 250/574; 250/576; 250/577; 250/903; 347/7
[58] Field of Search ................................. 250/576, 577, 250/573, 900, 903, 221, 222.1, 574, 575; 347/6, 7, 86, 87

[56] References Cited

U.S. PATENT DOCUMENTS

| | | | |
|---|---|---|---|
| 4,164,077 | 8/1979 | Thomas | 33/348 |
| 4,246,489 | 1/1981 | Yoshida et al. | 250/577 |
| 4,432,005 | 2/1984 | Duffield et al. | 347/86 |
| 4,788,444 | 12/1988 | Williams | 250/577 |
| 4,979,797 | 12/1990 | Nemeth | 350/96.29 |
| 5,079,570 | 1/1992 | Mohr et al. | 346/140 R |
| 5,101,219 | 3/1992 | Gerber et al. | 346/1.1 |
| 5,278,426 | 1/1994 | Barbier | 250/577 |
| 5,399,876 | 3/1995 | LaClair | 250/577 |

FOREIGN PATENT DOCUMENTS

| | | |
|---|---|---|
| 60-32667 | 2/1985 | Japan . |
| 61-249761 | 11/1986 | Japan . |
| 62-156963 | 7/1987 | Japan . |
| 3-84142 | 8/1991 | Japan . |

*Primary Examiner*—Stephone Allen
*Attorney, Agent, or Firm*—Oliff & Berridge

[57] ABSTRACT

An inexpensive ink tank having an ink remaining amount detection section which can be used with ink of any color is disclosed. An optical ink detection section formed from a light transmitting material has an inclined interface and is formed integrally with the ink tank. Incident light from a light source is refracted, when ink is present in the ink tank, at the interface to make refraction light and does not emerge to a visual observation portion. When no ink is present, the incident light is totally reflected by the interface to make total reflection light, which can be visually observed at the visual observation portion. A roughened face is formed at the visual observation portion so that light emerging to the visual observation portion may be scattered to facilitate visual observation.

15 Claims, 4 Drawing Sheets

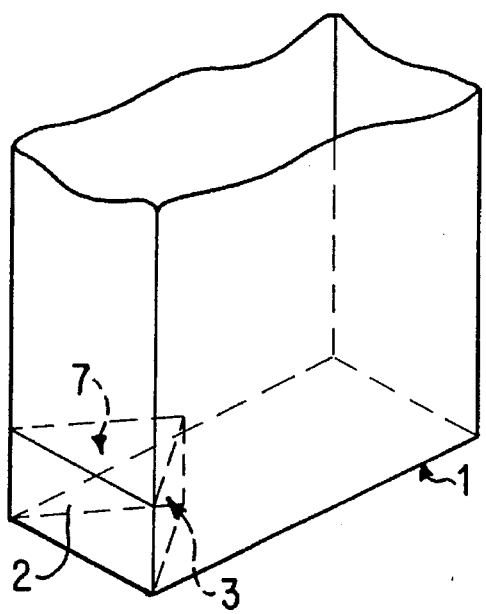
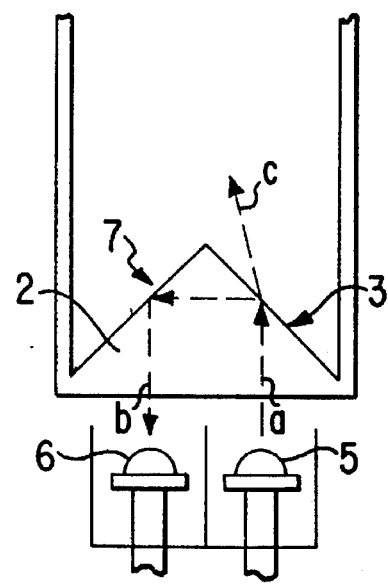
FIG. 5A  FIG. 5B
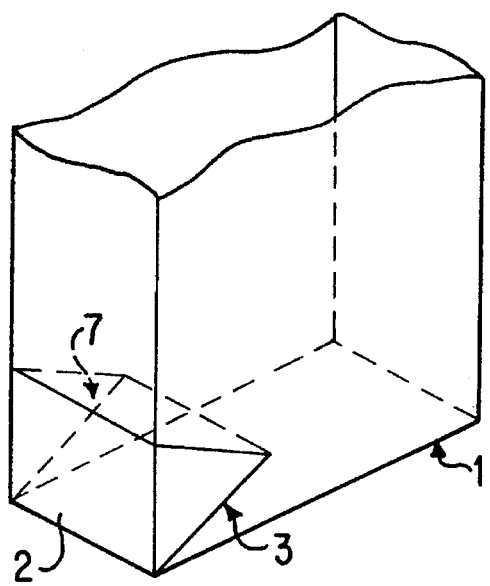
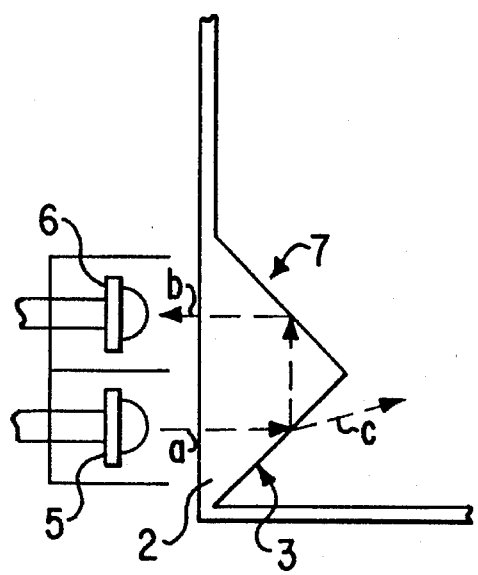
FIG. 6A  FIG. 6B

INK TANK WITH AN INK LEVEL DETECTOR HAVING A VIEWING WINDOW

This is a continuation application Ser. No. 08/321,268 filed Oct. 11, 1994, now abandoned.

BACKGROUND OF THE INVENTION

1. Field of the Invention

This invention relates to an ink tank on which an ink remaining amount detection apparatus is provided.

2. Description of the Related Art

Various proposals have been made for an ink remaining amount detection apparatus for an ink tank of the type wherein electric current for detection flows between a pair of electrodes provided in an ink tank so that presence or absence of remaining ink is detected based on the value of the electric current flowing through the ink. An ink remaining amount detection apparatus which employs electrodes, however, is complicated not only in the structure for embedding the electrodes in the ink tank and the structure for leading out wiring lines from the electrodes but also in an electric circuit, and a high cost cannot be avoided.

Also an apparatus for optically detecting the remaining amount of ink is already known. FIG. 7A schematically shows an exemplary apparatus of the type just mentioned. Referring to FIG. 7A, the apparatus shown includes an ink detection section 11, a light source 12 and a light receiving element 13. The ink detection section 11 is provided at a portion of an ink tank or of an ink flow passage and is formed from a light transmitting material. The light source 12 and the light receiving element 13 are disposed on the opposite sides of the ink detection section 11, and transmission light through the ink detection section 11 is detected by the light receiving element 13 to detect presence or absence of ink from presence or absence of light or from the intensity of light. A light emitting element or a like element is employed for the light source 12.

However, where a light source for visible rays is used for black ink, there is no problem in detection of presence or absence of light or of the intensity of light. However, if infrared rays are employed, which are less likely to be influenced by disturbance light, some black ink transmits infrared rays therethrough, and discrimination of presence or absence of the ink cannot be accomplished. Further, infrared rays cannot be used for some color ink.

FIG. 7B schematically shows another apparatus wherein a beam of light of a particular wavelength is employed. Referring to FIG. 7B, the apparatus shown includes, in addition to an ink detection section 11, a light source 12 and a light receiving element 13 which are all provided in the apparatus shown in FIG. 7A, a filter 14. In the apparatus, the light source 12 for visible rays and the filter 14 are provided in combination such that light conforming to the color of object ink is used. However, the apparatus is influenced readily by disturbance light, and is complicated in construction and consequently requires a high cost.

SUMMARY OF THE INVENTION

It is an object of the present invention to provide an ink tank having an inexpensive ink remaining amount detection section which can be used for ink of any color.

It is another object of the present invention to provide an ink tank having an inexpensive ink remaining amount detection section which can employ a light source of any wavelength.

In order to attain the objects described above, according to an aspect of the present invention, there is provided an ink tank, which comprises an ink tank body made of a light transmitting material for accommodating ink therein, and an optical ink detection section made of the same material as that of the ink tank body and having an interface with the ink in the ink tank body, the interface having a predetermined angle with respect to a passage along which light for detection passes.

Where the light transmitting material is a visible light transmitting material, the optical ink detection section may be disposed such that the remaining amount of the ink in the ink tank body is detected by visual observation of light from a visible ray emitting element.

Alternatively where the light transmitting material is an infrared ray transmitting material, an infrared ray emitting element and an infrared ray receiving element may be interposed in the passage of light for detection so that the remaining amount of the ink in the ink tank body is electrically detected.

Preferably, the ink tank body and the optical ink detection section are formed as a unitary member.

With the ink tank, since the interface of the optical ink detection section formed from an optical transmitting material has a predetermined angle with respect to the passage of light for detection, the remaining amount of the ink in the ink tank body can be detected without being influenced by the color of the ink. Where the ink tank body and the optical ink detection section are formed as a unitary member, presence or absence of the remaining ink can be detected with certainty and at a reduced cost.

According to another aspect of the present invention, there is provided an ink remaining amount detection apparatus for an ink tank, which comprises an ink tank body made of, at least a portion thereof, a light transmitting material for accommodating ink therein, the ink tank body being constructed so that the ink contacts with an area of the portion thereof in which the ink tank body is made of the light transmitting material. A light irradiation device irradiates light at a predetermined angle with respect to a perpendicular to the light transmitting material portion of the ink tank body. A light transmission window transmits therethrough the light irradiated from the irradiation means and reflected by the light transmitting material portion of the ink tank body.

Also with the ink remaining amount detection apparatus, the advantages achieved by the ink tank of the present invention can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5A is a schematic perspective view of a yet further ink tank showing a fifth preferred embodiment of the present invention, and FIG. 5B is a diagrammatic view illustrating operation of the ink tank of FIG. 5A;

FIG. 6A is a schematic perspective view of a yet further ink tank showing a sixth preferred embodiment of the present invention, and FIG. 6B is a diagrammatic view illustrating operation of the ink tank of FIG. 6A;

DESCRIPTION OF THE PREFERRED EMBODIMENTS

Figure 8:
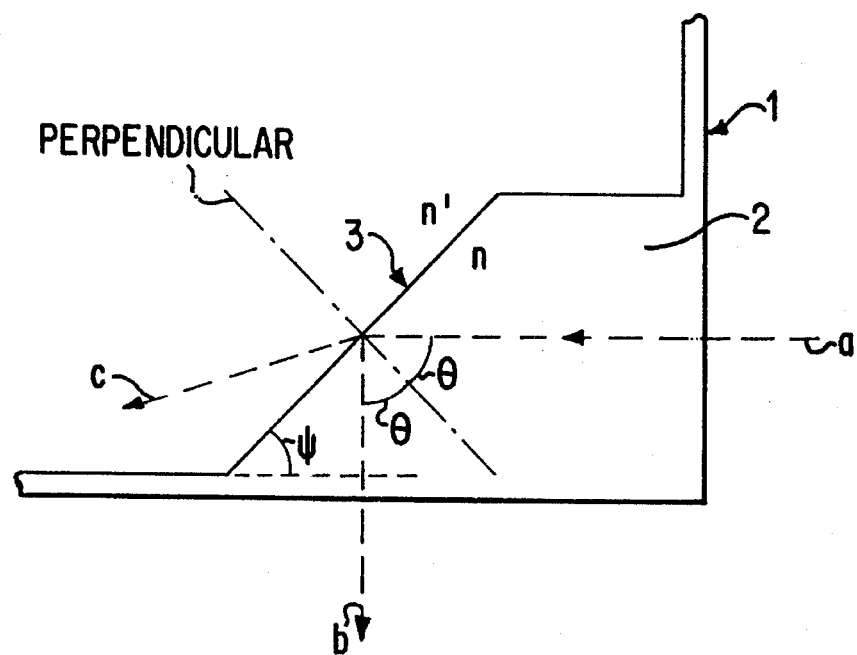
FIG. 8 is a diagrammatic view showing an ink tank having a basic construction of an ink remaining amount detection apparatus according to the present invention.

Referring first to FIG. 8, there is shown a basic construction of an ink tank according to the present invention. The ink tank shown includes an ink tank body 1, an optical ink detection section 2, and an interface 3. The optical ink detection section 2 is made of a light transmitting material same as that of the ink tank body 1, and the interface 3 of the optical ink detection section 2 is formed obliquely at an angle $\psi$ with respect to the path of incident light such that the optical ink detection section 2 makes a kind of prism. In the arrangement shown in FIG. 8, the optical ink detection section 2 is provided at the bottom of the ink tank body 1.

When there is no ink present in the ink tank body 1, incident light a comes upon the inclined face of the prism at an angle of $\theta$. Where the refraction factor n of the optical ink detection section 2 is $$n > 1/\sin \theta$$

the total reflection condition is satisfied at the interface 3 from the Snell's law, and consequently, the incident light a makes total reflection light b having the angle $\theta$, which is outputted to the outside of the ink tank body 1 For example, where $\psi=45°$, if $$n > 1/\sin\theta = 1/\sin(LR-4) = 1/\sin 45° = 1.414$$

then total reflection occurs at the interface 3.

On the other hand, when there is liquid ink present in the ink tank body 1, where n' is the refraction factor of the liquid ink, if $$n'/n < 1/\sin \theta$$

then total reflection does not occur, and the incident light a makes refraction light c which has the angle $\theta'$ given by $$\sin \theta' = (n/n') \times \sin \theta$$

and the refraction light c is transmitted through the liquid ink. For example, where $\psi=45°(\theta=45°)$
$n=1.5$ (acrylic material) and
$n'=1.333$ (water)
the angle $\theta'$ is given as $$\begin{aligned} \theta' &= \sin^{-1}\theta \\ &= \sin^{-1}((n/n') \times \sin\theta) \\ &= \sin^{-1}((1.5/1.333) \times 0.707) \\ &= 52.7° \end{aligned}$$

and the refraction light is transmitted through the water.

Thus, if the optical ink detection section is formed from a light transmitting member having such an incident angle $\theta$ and a refraction factor n at which it totally reflects incident light when no liquid ink is present in the ink tank but it refracts incident light when liquid ink is present in the ink tank, then absence or presence of liquid ink can be detected from presence or absence of total reflection light. Presence or absence of such total reflection light can be detected by visual observation or using a photoelectric element, which allows realization of a very inexpensive ink tank. Formation of the optical ink detection section together with the ink tank allows realization of a more inexpensive ink tank.

Since the refraction factor of the ink matters as described above, the transmission property depending upon the color of the ink does not matter. Accordingly, it is apparent not only that the ink may be of any color, but also that any material may be used as the material of the optical ink detection section if it transmits and refracts light of a wavelength employed.

Figure 1A:
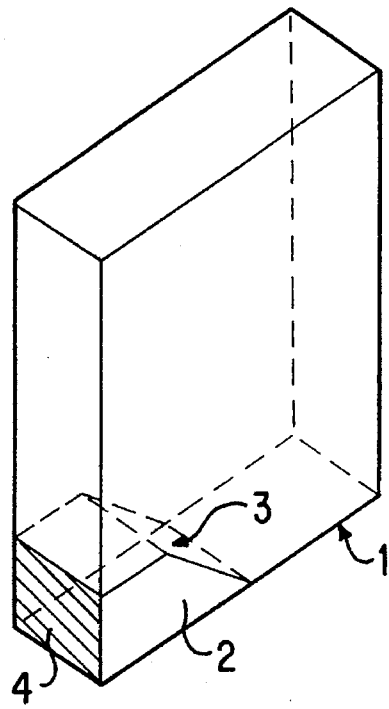
FIG. 1A is a schematic perspective view of an ink tank showing a first preferred embodiment of the present invention.
Figure 1B:
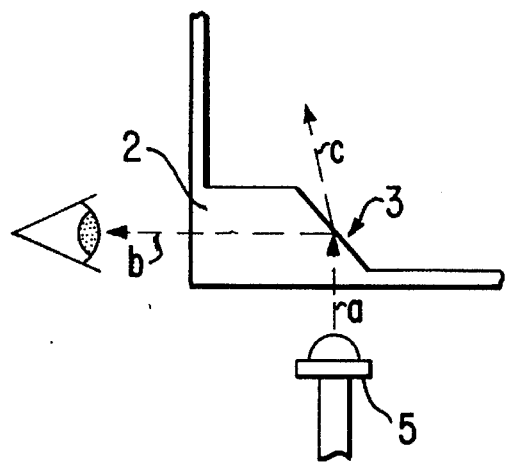
FIG. 1B is a diagrammatic view illustrating operation of the ink tank of FIG. 1A.

FIG. 1A shows an ink tank according to a first preferred embodiment of the present invention, and FIG. 1B illustrates operation of the ink tank shown in FIG. 1A. Referring to FIG. 1A, the ink tank includes an ink tank body 1, an optical ink detection section 2, an interface 3, a visual observation portion 4 and a light source 5. In the present embodiment, the optical ink detection section 2 is formed integrally with the ink tank body 1 and provided at the bottom of the ink tank body 1. Referring also to FIG. 1B, when ink is present in the ink tank body 1, incident light a to the optical ink detection section 2 from a light source 5 below the optical ink detection section 2 is refracted at the interface 3 to make refraction light c, and no light emerges to the visual observation portion 4. On the contrary when there is no ink in the ink tank body 1, the incident light a is totally reflected by the interface 3 to make total reflection light b, which is visually observed at the visual observation portion 4. The visual observation portion 4 has a roughened face formed by blasting or like means. Light coming to the visual observation portion 4 is scattered by the roughened face to facilitate visual observation. The roughened face, however, need not necessarily be provided. It is to be noted that, while the light source 5 is shown, in FIG. 1B, in the form of an LED (light emitting diode), any other suitable light source may be employed for the light source 5 only if it emits light within the range of visible rays such as an incandescent lamp.

Figure 2A:
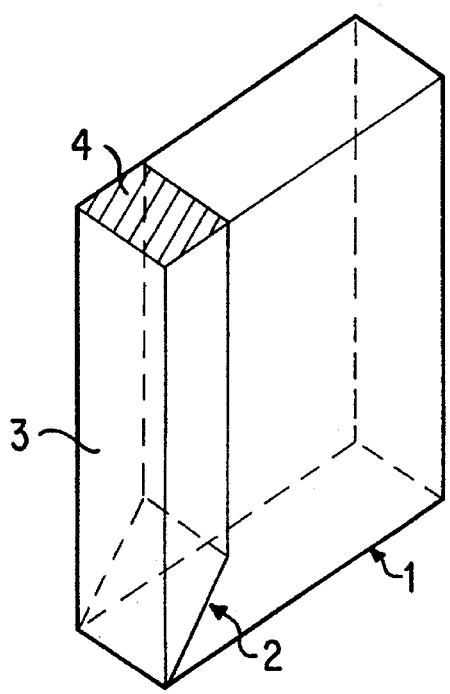
FIG. 2A is a schematic perspective view of another ink tank showing a second preferred embodiment of the present invention.
Figure 2B:
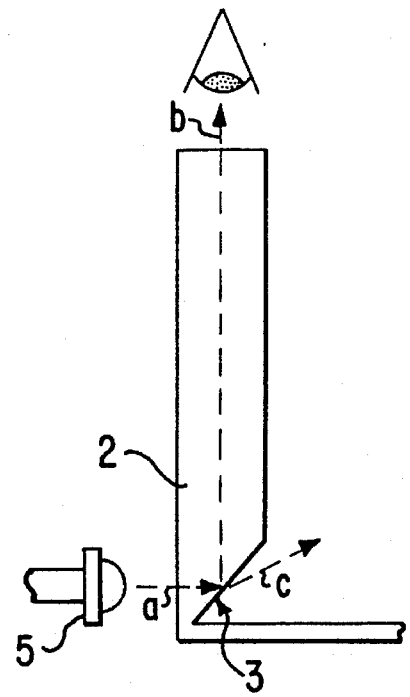
FIG. 2B is a diagrammatic view illustrating operation of the ink tank of FIG. 2A.

FIG. 2A shows an ink tank according to a second preferred embodiment of the present invention, and FIG. 2B illustrates operation of the ink tank shown in FIG. 2A. The ink tank of the present embodiment is constituted from similar components to those of the first embodiment and hence is a modification to the ink tank of the first embodiment shown in FIG. 1, and overlapping description of the individual components is omitted herein to avoid redundancy. This similarly applies to the other embodiments described hereinbelow.

Referring to FIGS. 2A and 2B, the visual observation portion 4 is provided at an upper portion of the ink tank body 1. Incident light a from the light source 5 located adjacent a side face of the ink tank body 1 is refracted, when ink is present in the ink tank body 1, at the interface 3 to make refraction light c and little emerges to the visual observation portion 4. On the contrary, when there is no ink present in the ink tank body 1, the incident light a is totally reflected by the interface 3 to make total reflection light b, which is visually observed at the visual observation portion 4 at the upper location.

Figure 3A:
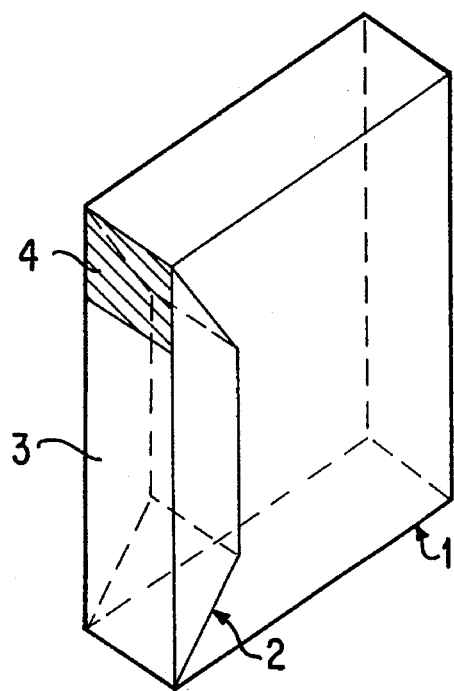
FIG. 3A is a schematic perspective view of a further ink tank showing a third preferred embodiment of the present invention.
Figure 3B:
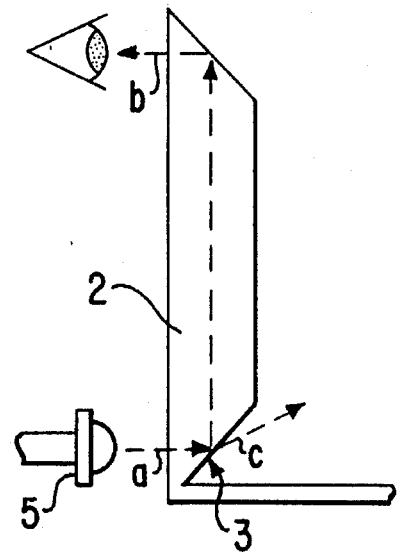
FIG. 3B is a diagrammatic view illustrating operation of the ink tank of FIG. 3A.

FIG. 3A shows an ink tank according to a third preferred embodiment of the present invention, and FIG. 3B illustrates operation of the ink tank shown in FIG. 3A. Referring to FIGS. 3A and 3B, an inclined face portion similar to the interface 3 is provided also at an upper portion of the ink tank body 1 so that reflection light from the interface 3 may be reflected by the inclined face portion and visually observed at the visual observation portion 4 provided on a side face of the ink tank body 1. The inclined face portion at the upper location may be formed as a mirror face.

Figure 4A:
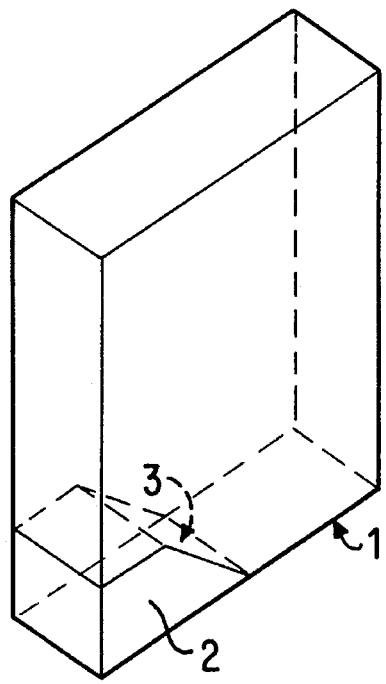
FIG. 4A is a schematic perspective view of a still further ink tank showing a fourth preferred embodiment of the present invention.
Figure 4B:
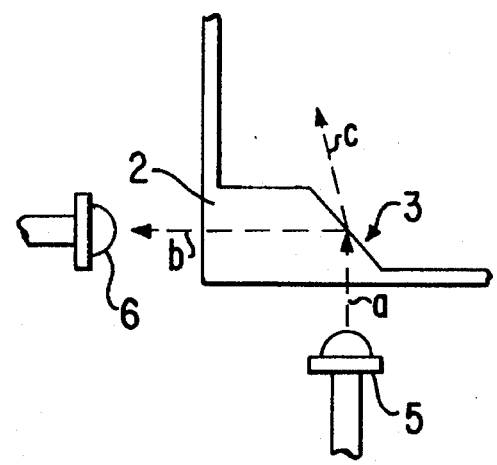
FIG. 4B is a diagrammatic view illustrating operation of the ink tank of FIG. 4A.
Figure 7A:
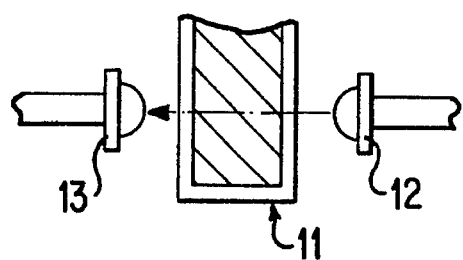
FIGS. 7A and 7B are schematic views showing different conventional apparatus for optically detecting the remaining amount of ink.
Figure 7B:
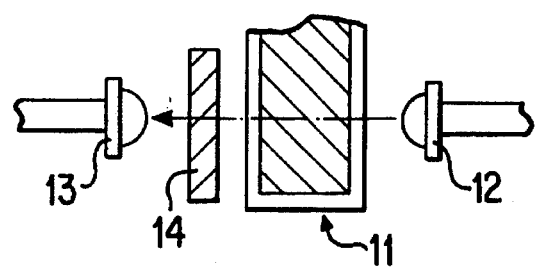

FIG. 4A shows an ink tank according to a fourth preferred embodiment of the present invention, and FIG. 4B illustrates operation of the ink tank shown in FIG. 4A. Referring to FIGS. 4A and 4B, a light receiving element 6 is additionally provided, and instead, the visual observation portion 4 is omitted. The light receiving element 6 may be, for example, a photodiode or a phototransistor. In the present embodiment, the light receiving element 6 is employed in place of visual observation by eyes to allow electric detection of the remaining amount of ink. Consequently, the present apparatus is not only superior in terms of notification such as development of an alarm but also advantageous in terms of control such as to stop printing. The ink tank operates similarly to the ink tank of the first embodiment, but total reflection light b from the interface 3 is detected by means of the light receiving element 6. It is apparent that a light receiving element can be applied similarly to the ink tank of the second or third embodiment described above. It is to be noted, however, that, where a light receiving element is employed, no roughened face should be formed.

Here, as regards the wavelength of light to be used, the light is not limited to visible rays, but may be infrared rays which are tough against disturbance noise. Where infrared rays are employed, the light transmitting member need not be transparent in regard to visible rays and are only required to transmit infrared rays therethrough. For example, while a brown PEI (polyetherimide) material or a like material looks brown with visible rays, it transmits little ultraviolet rays, but it transmits infrared rays very well. Employment of such material allows detection which is unaffected by disturbance light such as light of a fluorescent lamp.

FIG. 5A shows an ink tank according to a fifth preferred embodiment of the present invention, and FIG. 5B illustrates operation of the ink tank shown in FIG. 5A. Referring to FIGS. 5A and 5B, the ink tank is a modification to but is different from the ink tank of the fourth embodiment described above in that it additionally includes another interface 7 similar to the interface 3. In the present embodiment, a triangular prism is formed as the optical ink detection section 2. When there is no ink in the ink tank body 1, total reflection light from the interface 3 is introduced to the interface 7. In this instance, since there is no ink at the interface 7 either, the total reflection condition is met, and the total reflection light is totally reflected by the interface 7 so that it is introduced into the light receiving element 6.

Here, while the light emitting element 5 and the light receiving element 6 may be separate members, a reflection type sensor wherein a light emitting element and a light receiving element are formed as a unitary member may be employed for them. Accordingly, there are advantages that the entire detector can be formed with a reduced size and that parts on the market can be utilized readily.

FIG. 6A shows an ink tank according to a sixth preferred embodiment of the present invention, and FIG. 6B illustrates operation of the ink tank shown in FIG. 6A. Referring to FIGS. 6A and 6B, the ink tank is a modification to the ink tank of the fifth embodiment in that the optical ink detection section 2 is formed as a triangular prism. The prism, however, is arranged such that the two interfaces 3 and 7 are arranged on a vertical line, and the light source 5 disposed below the light receiving element 6. However, the positions of the light source 5 and the light receiving element 6 may alternatively be switched.

Also in the present embodiment, similarly to the fifth embodiment, when there is no ink in the ink tank body 1, total reflection light b from the interface 3 is reflected by the interface 7 and introduced into the light receiving element 6. It is to be noted that, in the fifth or sixth embodiment, one of the interfaces 3 and 7 may be formed as a mirror face. Further, while the optical ink detection section is formed at a portion of a side wall of the ink tank body 1, it may be formed otherwise on a bottom face of the ink tank body 1.

The optical ink detection section described above need not necessarily be provided at or adjacent the bottom of the ink tank body. For example, it may be provided at a location a little higher than the bottom so that absence of the remaining amount of ink may be informed beforehand. Or, a plurality of optical ink detection sections may be provided at different vertical positions to allow stepwise detection of the remaining amount of ink.

As can be seen from the embodiments described above, the light source need not necessarily be provided in close contact with the ink tank. This similarly applies also where a light emitting element and a light receiving element are provided, and they need not be provided in close contact with the ink tank. It is only required that those elements be disposed at such distances from the ink tank and have such structures that direct reflection light obtained from rays of light incident to the optical ink detection section may not be inputted to the light receiving element, and it is apparent that it is easy to devise a structure wherein the light emitting element and the light receiving element are provided on a recording apparatus body so as to allow replacement of the ink tank.

It is to be noted that any of the interfaces described above is preferably processed by coating processing using an ink repellent substance or formed from an ink repellent material as the light transmitting material so that ink may less likely stick to the interface, which allows detection of a higher degree of accuracy.

Having now fully described the invention, it will be apparent to one of ordinary skill in the art that many changes and modifications can be made thereto without departing from the spirit and scope of the invention as set forth herein.

What is claimed is:

1. An ink tank, comprising:

an ink tank body made of a light transmitting material for accommodating ink therein; and an optical ink detection device made of the same material as that of said ink tank body and comprising a body member connected interiorly to and integrally with the ink tank at the vicinity where a presence or an absence of the ink is to be detected whereby incident light being emitted exteriorly of the ink tank body enters at a first exterior area of the ink tank body and through the body member in a direction to impinge upon an interface surface of the body member, the interface surface disposed at an oblique angle relative to the direction of the incident light so that, when the ink fails to contact the interface surface, reflecting light reflected from the interface surface is emitted at a second exterior area of the ink tank body thereby indicating absence of the ink where the optical ink detection device is located and, when the ink contacts the interface surface, refracted light refracted from the interface surface is transmitted through the ink in lieu of the reflecting light being emitted at the second exterior area thereby indicating presence of the ink where the optical ink detection device is located.

2. An ink tank according to claim 1, wherein the light transmitting material is a visible light transmitting material, and said optical ink detection device is disposed such that the remaining amount of the ink in said ink tank body is detected by visual observation of light from a visible ray emitting element.

3. An ink tank according to claim 1, wherein the light transmitting material is an infrared ray transmitting material, and an infrared ray emitting element and an infrared ray receiving element are interposed in the passage of light for detection so that the remaining amount of the ink in said ink tank body is electrically detected.

4. An ink level detection, apparatus for an ink tank, comprising an ink tank body made of a light transmitting material for accommodating ink therein, the ink level detection apparatus for allowing detection of ink by one of an observer and an optical detection means, the ink level detection apparatus comprising:

a body member connected interiorly to and integrally with the ink tank at the vicinity where a presence or an absence of the ink is to be detected whereby incident light being emitted exteriorly of the ink tank body enters at a first exterior area of the ink tank body and through the body member in a direction to impinge upon an interface surface of the body member, the interface surface disposed at an oblique angle relative to the direction of the incident light so that, when the ink fails to contact the interface surface, reflecting light reflected from the interface surface is emitted at a second exterior area of the ink tank body thereby indicating absence of the ink where the body member is located and, when the ink contacts the interface surface, refracted light refracted from the interface surface is transmitted through the ink in lieu of the reflecting light being emitted at the second exterior area thereby indicating presence of the ink where the body member is located.

5. An ink level detection apparatus according to claim 4, wherein the light transmitting material has a refraction factor which satisfies the following expression $$n > 1/\sin \theta$$

when the ink tank is empty, where n is the refraction factor, and $\theta$ is the predetermined angle.

6. An ink remaining amount detection apparatus according to claim 5, wherein the refraction factor n of the light transmitting material further satisfies, when the ink is accommodated in said ink tank body, the following expression $$n/n' < 1/\sin \theta$$

where n' is the refraction factor of the ink.

7. An ink level detection apparatus according to claim 4, wherein the second exterior area is a light scattering window.

8. An ink level detection apparatus according to claim 7, wherein the light transmitting material is a visible light transmitting material, and said light scattering window is disposed such that the remaining amount of the ink in said ink tank body is detected by visual observation of an absence of reflected light at the light scattering window.

9. An ink level detection apparatus according to claim 4, further comprising optical detection means disposed at a location opposing to the second exterior area for detecting the reflected light reflected from the interface surface.

10. An ink level detection apparatus according to claim 9, wherein the light transmitting material is an infrared ray transmitting material, and further comprises a light irradiation means including an infrared ray emitting element while said optical ink detection device includes an infrared ray receiving element for detecting infrared rays thereby to electrically detect the remaining amount of the ink in said ink tank body.

11. A liquid level detection apparatus adapted for use with a tank fabricated of a light transmitting material to determine whether a liquid is either present or absent within the tank at a vicinity where the liquid detection apparatus is located, the liquid level detection apparatus comprising:

a body member fabricated of an identical material as the tank and connected interiorly to and integrally with the tank at the vicinity where a presence or an absence of the liquid is to be detected whereby incident light being emitted exteriorly of the tank enters at a first exterior area of the tank and through the body member in a direction to impinge upon an interface surface of the body member, the interface surface disposed at an oblique angle relative to the direction of the incident light so that, when the liquid fails to contact the interface surface, reflecting light reflects from the interface surface to appear at a second exterior area of the tank thereby indicating the absence of the liquid where the liquid level detection apparatus is located and, when the liquid contacts the interface surface, refracted light refracts from the interface surface and through the liquid thereby inhibiting the reflecting light from appearing at the second exterior area to indicate the presence of the liquid where the liquid level detection apparatus is located.

12. A liquid level detection apparatus according to claim 11, wherein the incident light is selected from a group consisting of natural visible light, non-natural visible light and infrared light.

13. A liquid level detection apparatus according to claim 11, further comprising a light detector operative for detecting the reflecting light at the second exterior area.

14. A liquid level detection apparatus according to claim 13, wherein said light detector is an observer's eye so that a visual determination can be made for determining the presence or absence of the liquid in the tank.

15. A liquid level detection apparatus according to claim 11, whereby said light transmitting material is one of a visible light transmitting material and an infrared ray transmitting material.

* * * * *